United States Patent [19]

Koch et al.

[11] Patent Number: 5,737,075
[45] Date of Patent: Apr. 7, 1998

[54] ELECTRONIC IMAGING BY ENCODED IMAGE DETECTION

[76] Inventors: Mark E. Koch, 13040 Pennystone, Farmers Branch, Tex. 75244; William E. Case, 3105 Canongate, Arlington, Tex. 76015

[21] Appl. No.: 354,669

[22] Filed: Dec. 13, 1994

[51] Int. Cl.$^6$ .................................................. G01J 3/04
[52] U.S. Cl. .......................................... 356/310; 342/179
[58] Field of Search .......................... 343/725; 356/310; 342/156, 179; 364/826; 395/800, 375; 375/343

[56] References Cited

U.S. PATENT DOCUMENTS

| | | | |
|---|---|---|---|
| 3,578,980 | 5/1971 | Decker | 250/237 |
| 4,524,385 | 6/1985 | Billingsley | 358/113 |
| 4,799,795 | 1/1989 | Fateley | 356/310 |
| 4,856,897 | 8/1989 | Fateley | 356/301 |
| 5,047,783 | 9/1991 | Hugenin | 342/179 |
| 5,202,692 | 4/1993 | Hugenin | 342/179 |
| 5,379,135 | 1/1995 | Nakagaki et al. | 359/40 |
| 5,454,048 | 9/1995 | Davis | 382/281 |

OTHER PUBLICATIONS

Harwit and Sloane, "Hadamard Transform Optics" (book excerpt) 1979.
Swift, et al. "Hadamard Transform Imager and Imaging Spectrometer" 1976.
Goldsmith, et al. "Focal Plane Imaging Systems For Millimeter Wavelengths" 1993.
Novakoff, "FAA Bulk Technology Overview for Explosive Detection" 1992.
Chang et al, "An Active Square Loop Frequency Selective Surface", 1993.
Beer, "Walsh Transforms", 1981.
Sheen et al, "Near-Field Millimeter-Wave Imaging for Weapon Detection", 1992.

Primary Examiner—Georgia Y. Epps
Assistant Examiner—Dawn-Marie Bey

[57] ABSTRACT

A new system for millimeter wave electronic imaging is described. This system utilizes a spatial light modulator in the focal plane of the collection optics. Each pixel of the modulator is driven by a specific high duty cycle modulation function provided by a modulation function generation circuit. Thus the throughput radiation at each pixel is uniquely labeled(encoded). A post modulation detector sums the signal from all the pixels. Subsequent to detection, the appropriate transform of the sum signal yields specific pixel throughput radiation intensity levels. Several configurations are described including one transmittance configuration and two reflectance configurations. Three specific millimeter wave transmittance embodiments and one reflectance embodiment are also described.

3 Claims, 7 Drawing Sheets

ELECTRONIC IMAGING BY ENCODED IMAGE DETECTION

BACKGROUND-FIELD OF INVENTION

This invention relates most broadly to the field of electronic imaging systems and more specifically to the field of millimeter-wave imaging systems.

BACKGROUND-DESCRIPTION OF PRIOR ART

Electronic imaging is a pervasive field spanning the electromagnetic spectrum from the ultraviolet to radio waves. Electronic imaging is, most broadly, the process of transforming radiation from a scene as collected across an input aperture into electronic information capable of visualization on a monitor or for further image processing. The scene radiation may be emitted or reflected from the objects of concern. Several methods for capturing images have been successfully employed. Traditionally, scanning techniques have been employed such as in the electron beam scanned vidicon tube used in visible wavelength range television cameras. Mechanically scanned systems such as FLIR systems in the infrared and imaging radiometers and radars at millimeter through radio wavelengths are also common.

An interesting hybrid concept for predetection signal processing of optical information(U.S. Pat. No. 4,524,385), hereafter called "flexi-FLIR", employs a special type of spatial light modulator in the focal plane of the collection optics. More generally, a spatial light modulator is a planar array of apertures with modulation control of some physical quantity associated with the radiation field maintained at each aperture. In the flexi-FLIR case the reflectance of selected areas in the focal plane of the collection optics is turned on briefly and sequentially to return light to a single detector or small array of detectors. A sequential time varying signal from the detector is thus correlated with particular scene element positions. The main disadvantage of flexi-FLIR is that the signal integration time for a scene element is limited to a small fraction of the frame time since scene elements are either raster or randomly scanned. Signal to noise is thus substantially lower than for staring focal plane detector arrays.

Another electronic imaging technique employs a full input aperture phased array scanner mostly used at microwave and longer wavelengths. However, phased arrays are usually deemed too complex and costly at millimeter and shorter wavelengths.

Recently, focal plane arrays have replaced scanned systems for most applications in the visible and infrared regions. For example, CCD arrays have largely replaced vidicon tubes in television cameras. Most recently, focal plane arrays have been used at millimeter wavelengths(U.S. Pat. No. 5,047,783 and 5,202,692). Millimeter wavelengths span the electromagnetic spectrum from 1 centimeter(30 Gz) to 1 millimeter(300 Ghz). Such systems offer significant improvements over their predecessors(largely mechanically scanned systems.) due primarily to a large increase in signal integration time per imager frame time interval. Millimeter wave imagers are currently under consideration for applications in weapons and explosives detection systems(A. K. Novakoff,"FAA Bulk Technology Overview for Explosive Detection", SPIE 1814, 2(1992) and D. M. Sheen et al, "Near-field millimeter-wave imaging for weapon detection", SPIE 1824, 223(1992)) as well as for autonomous landing of aircraft(P. F. Goldsmith et al, "Focal Plane Imaging Systems for Millimeter Wavelengths", IEEE Transactions on Microwave Theory and Techniques, 41, #10,1664(1993)).

Although focal plane detector arrays have become commonplace, they suffer from certain disadvantages. For example, the image quality in an electronic imager requires uniformity of response across the image plane, but satisfactory detector uniformity is difficult to achieve at infrared and longer wavelengths. Correction algorithms may be applied to the image signal downstream, provided the response of each detector in the array is known. However, if these responses change over time, unavoidable image degradation will occur.

In the infrared, as well as at longer wavelengths, low signal levels in focal plane detectors require signal amplification of each picture element(pixel) to achieve satisfactory performance. The detector array is usually fabricated on a complex switching and amplification integrated circuit called the read out integrated circuit(ROIC). Obviously, the problem associated with the nonuniformity of response of each detector element discussed above is aggravated by the degree of nonuniformity of the amplifier/switch elements. In the infrared, the spatial extent of each diffraction limited spot is so small as to limit the number of possible transistors per pixel in the ROIC significantly. This makes the design of stable uniform amplifier arrays problematic. At longer wavelengths the space per pixel becomes less of an issue. However, amplifier stability deteriorates due to the high frequencies involved. High frequency amplification is required for direct detection at the fundamental frequency or down shifted frequencies(superheterodyne detection.)

One other class of electronic imagers employs a spatially encoded mask. The mask is most often a spatial array of transmitting and blocking apertures although phase retarding masks have been considered. When the mask is used in lieu of a focusing lens or mirror the technique has been termed coded aperture imaging and has found use in gamma and x-ray imaging. In yet another implementation a mask is placed in the focal plane of a lens in tandem with a single detector. This technique which has found use in infrared imagers has been termed Hadamard transform imaging(R. D. Swift et al, "Hadamard transform imager and imaging spectrometer", App. Opt., 15, 1595(1976) and M. Harwit and N. Stone, *Hadamard Transform Optics*, Academic Press (1979)) since the encoding mask is a physical representation of the Hadamard matrix, i.e., sequences of binary numbers. In Hadamard imaging, the mask, which is composed of pixel sized transparent and opaque regions, is advanced in one direction across the image plane. At each incremental position a signal is recorded by a detector which is positioned to collect and detect the radiation from the scene. The mask is so composed as to make each detected signal linearly independent of the others. If the mask is sequentially advanced n times, where n is the number of pixel elements in the image, n independent values of signal are recorded. The image can be detected by applying the appropriate transform to this data set. Most recently, this technique has been utilized in the infrared with spatial light modulators to simulate the spatial encoding mask(U.S. Pat. Nos. 4,856, 897, 4,799,795, 4,615,619).

The utility of the Hadamard transform imager of prior art depends in part on the limiting source of noise in the image process. If the limiting noise source is detector or amplifier noise, this technique outperforms an imaging system employing a single detector raster scanned over the image. In the ideal limit, it approaches the performance of a focal plane array. However, if the limiting source of noise is fluctuations in the signal due to scene radiation, the Hadamard imager slightly underperforms even the single detector raster scanned imager. This latter noise limitation is usually the case since each independent measurement sums the light signal from approximately half the pixels in the image and intensity of each pixel must be derived from this data set.

OBJECTS AND ADVANTAGES

One of the primary advantages of this new method for imaging is in the high degree of pixel to pixel response uniformity achievable in various light modulators as compared with focal plane detector array architectures.

In addition, the cost of this approach, especially at millimeter wavelengths, is expected to be substantially less than the cost of a focal plane detector array imagers where arrays of 10,000 antenna/detector/amplifier channels are being considered.

SUMMARY OF THE INVENTION

The subject of this invention is the teaching of a new method and apparatus for electronic imaging. The scene radiation may be emitted or reflected from the objects of concern. According to this method a spatial light modulator is placed in the focal plane of appropriate imaging optics. Each aperture in the modulator is driven by a unique time varying signal of high duty cycle. Thus the radiation throughput of each aperture is uniquely labeled(encoded), and the encoding takes place simultaneously for all apertures. After transmission through or reflection from the modulator surface, the electromagnetic radiation is detected by a single detector or a small array of detectors. The resulting signal is then decoded by a signal processor to yield the image. The present invention can be understood as incorporating the advantage of predetection signal processing as in the flexi-FLIR concept described above with the advantage of signal integration of the starring focal plane array.

The modulation of radiation can be accomplished in a variety of ways. The most common method employed is to vary the intensity transmission at a pixel. However, other physical properties of the radiation such as amplitude, phase and polarization can also be modulated to achieve encoding. Further, instead of passing radiation through the modulator, a reflectance modulator can be configured. While the subject of this disclosure is not limited to one modulation technique, the specific embodiments discussed below will employ intensity transmittance and reflectance modulators for simplicity.

A multiplicity of physical processes and device architectures have been used to implement modulators. These include liquid crystal light valves, thermochromics, electrochromics, micro-mirror arrays, various antenna coupled switches, etc. Again, this disclosure is not limited to any one physical process. However, the embodiments described below will employ simple antenna coupled switches.

The driving signal for each pixel is provided by a modulation function synthesis circuit. Communication of the modulation functions to the modulator is provided by a bus which is designed not to interact significantly with the incoming radiation. After the radiation impinges on the modulator surface it is collected with suitable optics and transmitted to a detector or small array of detectors. The detector includes suitable broad angle collection optics such as lenses, mirrors and other appropriate antenna structures. Detection can be accomplished by a variety of means including power law detection, photon detectors, and direct detection. The signal from the detector is the sum of the modulated signals from all pixels and in most cases needs to be amplified to a level suitable for further processing.

The final phase of the encoded image detector involves decoding the signal from the detector/amplifier by taking the appropriate transform of the signal. If the modulator is a two state switch arrangement, then the possibilities for pixel modulation functions are various sequences of binary numbers(e.g., 0 and +1 for opaque/transmission modulation or −1 and +1 for reflection/transmission modulation). The mask for an opaque transmission system is typically based on the cyclic S matrix derivable from a Hadamard matrix and the appropriate transform is inverse Hadamard transform. While this encoding technique, hereafter called the first algorithm has been described in the infrared, its utility has not been recognized at millimeter wavelengths. In this wavelength region the primary noise limitation is expected to be intrinsic detector noise, thus making the Hadamard imager highly desirable.

In a second algorithm, a different orthogonal function is impressed on each pixel. If the pixel modulation functions are sine and/or cosine functions, a Fourier transform will yield a power spectrum which gives the average radiation throughput of each pixel. In this spectrum each pixel is represented by a distinct section of the spectrum and correlated with a small spherical angle of observation(the Δspatial frequency). The advantage of the second algorithm over the first is a somewhat increased flexibility in design since the restriction to S matix encoding is removed. In fact, this method has implications in all wavelength regions and tends toward the performance of focal plane arrays for ideal modulators.

For two state(1,−1) modulators the second algorithm impresses time varying Walsh functions on the pixels. Walsh functions are orthogonal binary functions derivable from the Hadamard matrices. The appropriate transform computes the integral of the product of the total signal with each Walsh function over the frame time. The radiation intensity at each pixel is thus detected due to the orthogonality of Walsh functions(Tom Beer, "Walsh Transforms", Am. J. Phys., 49, 466(1981)). In the case of a (0,1) modulator the number 1 is added to each Walsh function to yield the appropriate modulation function. The appropriate transform is the integral of the product of F(t) with W where W is the set of Walsh functions. While the set of $1+W_i$(where $W_i$, i=1 . . . , is the ith Walsh function) is not strictly speaking orthogonal, the integral over the Walsh function domain of $(1+W_i) \times W_j$ is 1 if i=j and 0 otherwise. The set $1+W_i$ is therefore considered orthogonal in this disclosure and both $W_i$ and $W_i+1$ will be termed Walsh functions.

The technique as delineated in this disclosure does not limit itself to a unique set of modulation functions. However, it is assumed that the configuration of the modulator and post processor will indicate an optimum function set for each system.

Once the image is decoded it is stored for readout via standard electro-optics techniques to a display unit or available for further signal processing.

The method of imaging outlined above is generally limited in the claims to the millimeter wave region but also includes a new method of imaging which employs a spatial light modulator composed of a linear array of stripe modulators in tandem with a linear array of stripe detectors which is useful in any wavelength range. If the imaging optics are chosen so that a diffraction limited spot overlaps a sub array of independent modulator elements then the imager can be said to posses super-resolution, a topic of significant current interest.

While many schemes present themselves, in the interest of economy, only four specific millimeter-wave embodiments will be described in this disclosure. According to the first embodiment each modulator pixel is addressed independently. Thus an m by n array will have mxn unique driving functions. According to a second embodiment a linear stripe array modulator is arranged orthogonally and in tandem to a linear array of stripe modulators so that each pixel is encoded by the correlation of the respective linear array elements(stripes). In a third specific embodiment, a reflective modulator is used in conjunction with an off-axis imaging system. The modulator employed is essentially identical to the modulator used in the first specific embodiment. In the fourth specific embodiment an array of stripe modulators is arranged in tandem with and orthogonal to an array of stripe detectors.

BRIEF DESCRIPTION OF THE DRAWINGS

These and other objects, features and advantages of the invention will be more readily apparent from the following detailed descriptions of the specific embodiments of the invention in which.

DETAILED DESCRIPTION

This application relates to millimeter wave electronic imagers as indicated in the summary above. The basic system will be described first in three general implementations; namely, a transmittance configuration and two reflectance configurations. Two specific millimeter wave transmittance embodiments and one reflectance embodiment will then be described.

Figure 1:
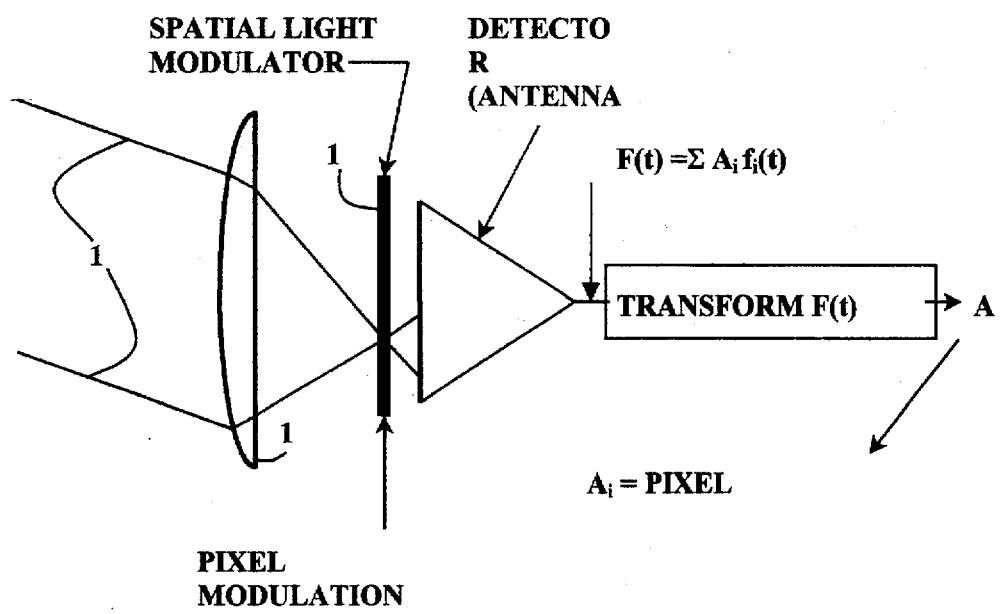
FIG. 1 is a schematic illustration of an electronic imaging system of the present invention utilizing a transmittance modulator.

FIG. 1 shows a schematic diagram for a transmittance configuration. Radiation from a scene is collected across an input aperture defined by a lens 10 or alternatively a mirror (not shown) from the scene. Two rays 14 representing one angular frequency or direction of input from a distant scene are shown. Each angle of incidence is focused by the lens to a unique position at the focal plane of the lens. If the system is imaging a scene "close" to the lens then unique small areal scene elements in the object plane are focused in the image plane to correlated regions. In either case, a spatial light modulator 15 operating within a selected frequency band is placed at the image plane of the lens or mirror. Each pixel of the modulator is driven by a unique time varying signal or modulation function $f_i(t)$.

After transmission through the modulator the radiation is collected and detected. The process of collection may be abetted by field lenses, non-imaging concentrators and other antenna structures which reduce to a small number the number of detector elements required to sense the signal. The signal at this point is the sum of all the modulated signals, $F=\Sigma A_i f_i(t)$. At millimeter wavelengths it is anticipated that a wide bandwidth linear amplifier will be used to increase the signal to a level suitable for further processing. After amplification the signal F is decoded by the application of the appropriate transform in a signal processor. This yields the amplitude of each scene pixel $A_i$. The image of the scene is basically now recovered and can be stored for subsequent readout by standard display techniques or for use in further processing applications.

Figure 2:
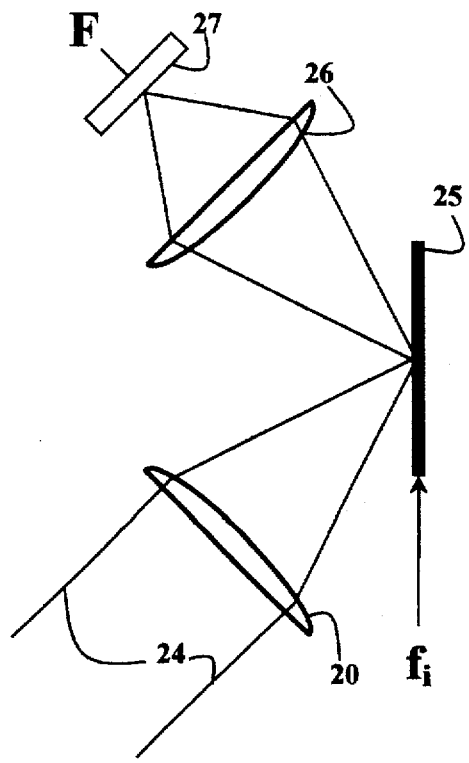
FIG. 2 is a schematic illustration of an electronic imaging system of the present invention utilizing a reflectance intensity modulator and an off-axis imaging system.

FIG. 2 shows a schematic diagram for a reflectance configuration. In this case an off axis imaging system is chosen. The scene is imaged on a modulator by the input lens In this figure principal rays 24 are shown. The reflectance of each pixel is labeled by unique modulator functions, $f_i$ at a reflectance modulator 25. After reflectance the scene is condensed by a lens 26 onto a detector 27 which, as in the previous case, provides a signal which is the sum F of modulated signals. Decoding by application of a transform and display or further processing are as described in the transmittance modulator above.

Figure 3:
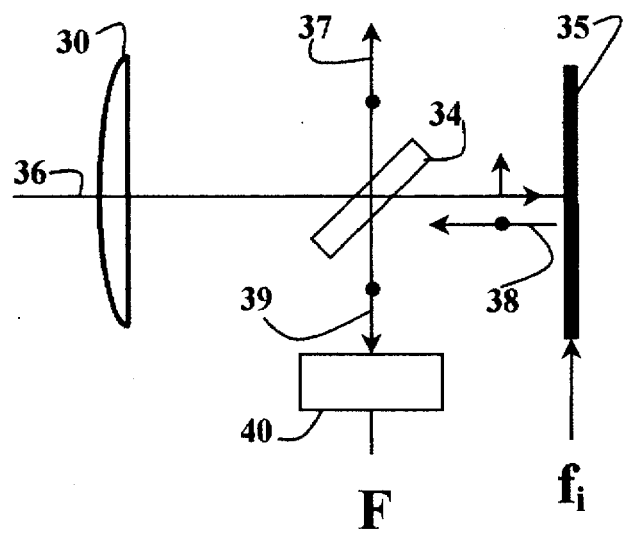
FIG. 3. is a schematic illustration of an electronic imaging system of the present invention utilizing a reflectance polarization modulator.

A reflectance configuration employing a polarization modulator is shown in FIG. 3. In this configuration light entering the system from the left is imaged by an input lens 30 through a linear polarizer 34 onto the modulator surface 35. Thus all light impinging on the modulator is polarized as shown by the arrow on the incoming ray 36. Light polarized normal to the direction shown by the arrow is depicted by the dark shaded circle on the ray reflected away from the system 37. Such polarization operation can be obtained from a simple wire grid polarizer or by combinations of compound prisms composed of uniaxial crystals. Each pixel in the modulator can be switched from simply reflecting the radiation to reflecting the radiation and rotating the plane of polarization 90° as shown by the dot on the reflected ray 38. The radiation with polarization normal to the incoming polarization 39 is now reflected by the polarizer into the detector 40. The light polarized in the same direction as the incoming radiation simply passes through the polarizer and is undetected. In this way sum signal, F, is collected for processing by the same method as in the transmittance configuration described above.

While Hadamard imagers have been utilized in the infrared their utility at millimeter wavelengths has not been generally recognized. Therefore, the Hadamard algorithm at millimeter waves is claimed as part of this disclosure. The choice of Hadamard versus the method of using different orthogonal functions for each pixel depends upon the availability of appropriate S matrices for the number of pixels in the image.

Figure 4:
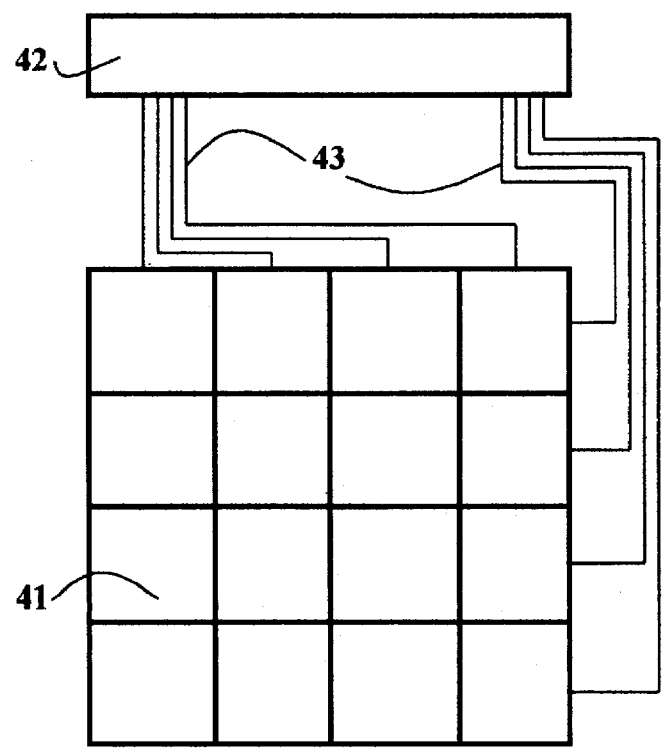
FIG. 4. is a schematic illustration of a 4×4 pixel modulator showing modulator function driving circuit and row and column address lines.

The first specific embodiment is a millimeter wave imager with each pixel addressed individually. The system employs a transmittance configuration as shown in FIG. 1. FIG. 4 shows the addressing scheme for a 4×4 pixel array. Each pixel is a small square area 41 in the array. A modulation function generation circuit 42 supplies signals to each row and column of the modulator as shown. The bus 43 which brings the modulation functions to the modulator is designed to have minimal interaction with the throughput radiation.

Figure 5B:
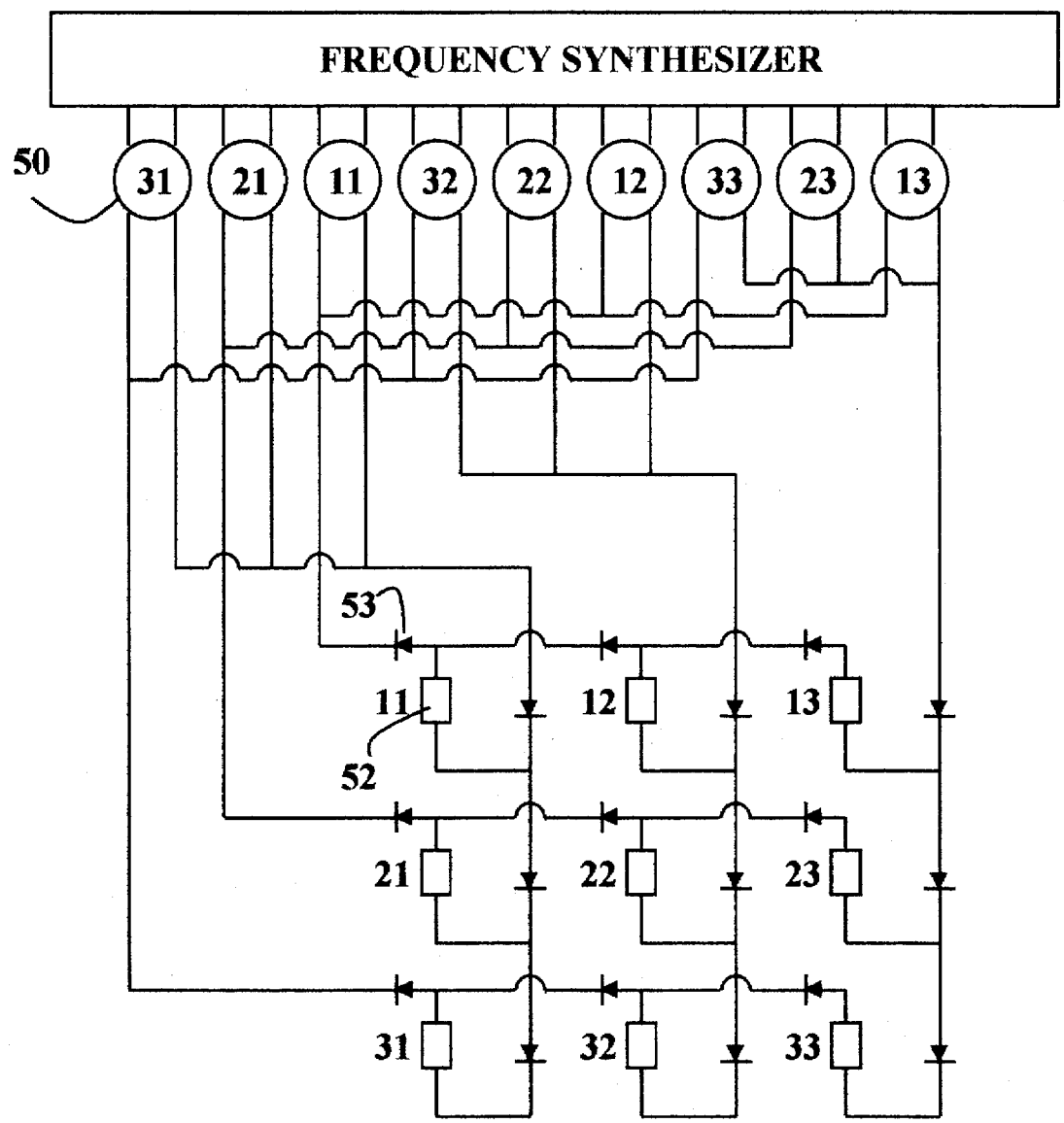
FIG. 5(a–b) is a schematic illustration of a 3×3 modulator showing individual pixel addressing with isolated modulation function sources.
Figure 5A:
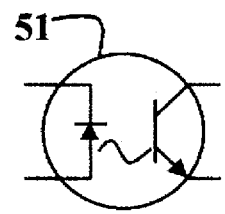

In order to drive the pixels independently of one another the modulation functions must be isolated from one another. A scheme to accomplish this isolation is shown in FIG. 5(a–b). Here opto-isolators 50 are used to effect isolation. Each opto-isolator is light emitter-sensor pair 51. Each modulation function must pass through a distinct opto-isolator. The modulation functions can now be thought of as an independent electrical sources. Each pixel is shown as a small rectangle 52. In this figure the elements in the modulator array are numbered to show the correlation with the related driving functions which are similarly numbered. Diodes 53 remove unwanted circuit paths which may otherwise result in spurious modulation. For simplicity, diodes on the vertical lines are not shown.

Figure 6A:
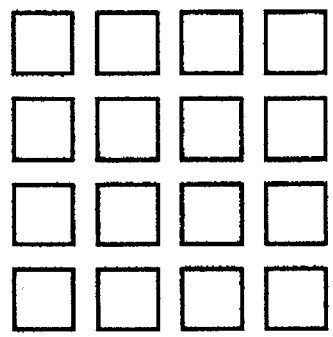
FIG. 6(a–c) is the response of an ideal modulator composed of arrays of switch loaded square loops.
Figure 6B:
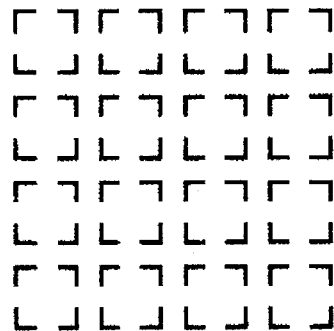
Figure 6C:
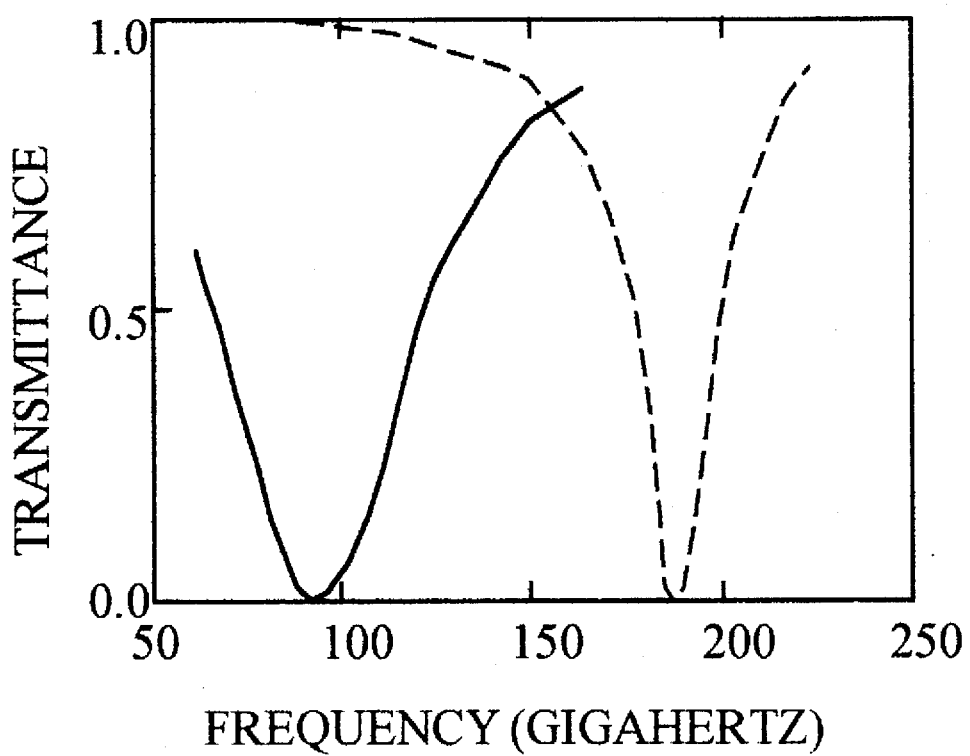

Individual pixel elements in the modulator array are composed of arrays of thin metallic square loops as shown in FIG. 6a. The optical properties of arrays of square loops have been described previously(T. K. Chang et al, "An Active Square Loop Frequency Selective Surface", IEEE Microwave and Guided Wave Lett.,3(10),387(1993)). Each loop has four switches, which when opened provide four gaps as shown in FIG. 6b. The radiation transmission for such an array is shown in FIG. 6c. The transmittance of the array with switches closed is given by the solid curve and the transmittance with switches open is given by the dotted curve. For the operation of this modulator attention is focused on the lower frequency minimum in transmission in FIG. 6c. The full width at half depth is termed the bandwidth of the structure. A pixel can therefore be switched from low to high transmission within the bandwidth of the structure by alternately closing and opening the switches in the gaps.

Figure 7:
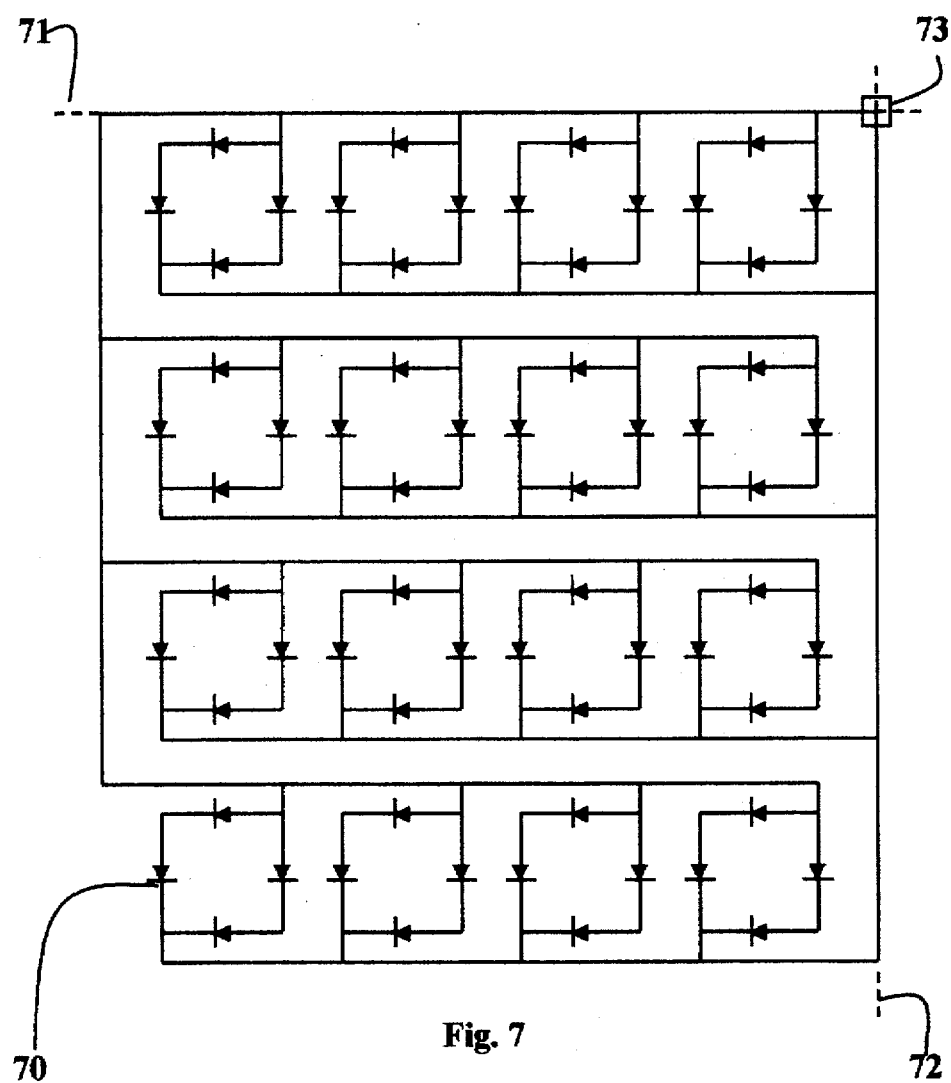
FIG. 7 is a schematic diagram of an 4×4 element pixel.

To effect switching, either Schottky or PIN diodes 70 are positioned in the gaps as shown in FIG. 7. Address and diode bias lines are thin conductive strips. The row 71 and column 72 address lines are isolated at crossover points by insulator patches 73. In order to keep the bias lines from interacting with the throughput radiation, small inductive regions are placed appropriately to remove resonant lengths of metalization from the structure(not shown). Alternatively, the impedance of the back of the modulator can be modified to remove reflection due to the address lines. The second technique reduces the angular response of the modulator. Blocking diodes 53 as shown in FIG. 5b are inherent within the diode structure of the pixel itself.

Figure 8:
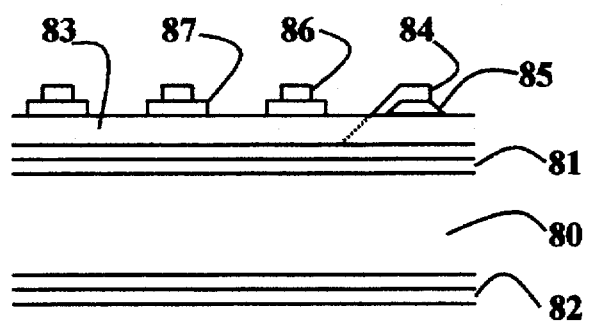
FIG. 8 is a crossectional view of a modulator element.

A crossectional view of the modulator is shown in FIG. 8. A transparent dielectric substrate 80 provides support for the modulator. Layered structures of differing dielectric media provide impedance matching between the substrate and the array on one side 81 and the substrate and air on the other side 82. The column metalized strips are in the same plane 83 as the rows except where they overlap. In the overlap area the column strip 84 is separated from the row strip by an insulator patch 85. The diodes 86 are shown on beam leads 87 which are electrically connected to the square loops, also in the same plane as the metalized stripes. Obviously, a monolithic architecture is also possible.

Figure 9:
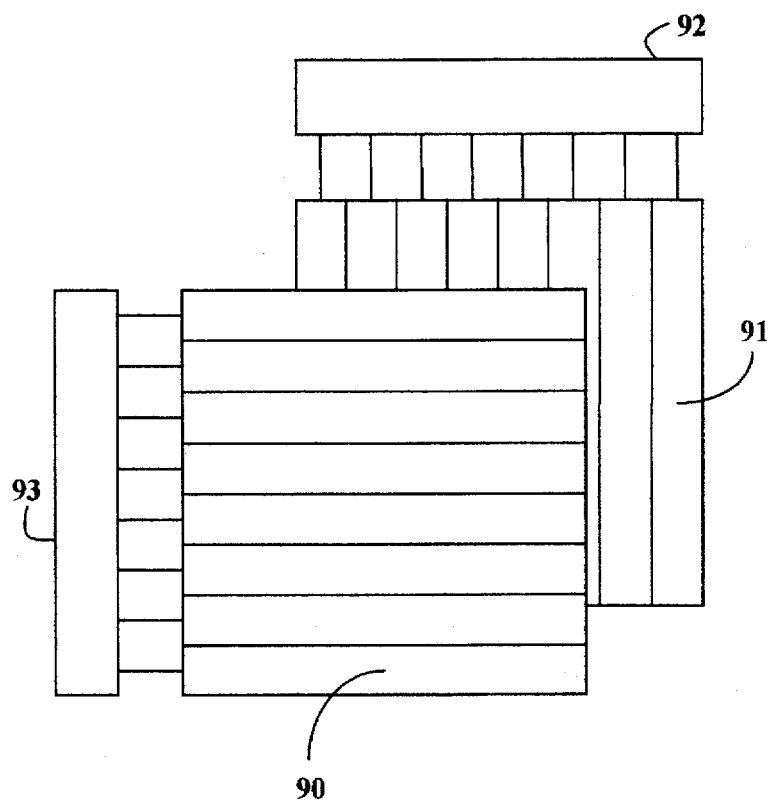
FIG. 9 is a schematic illustration of a modulator comprised of two near proximity orthogonal linear stripe modulator arrays or a stripe modulator followed by a stripe detector array.
Figure 10:
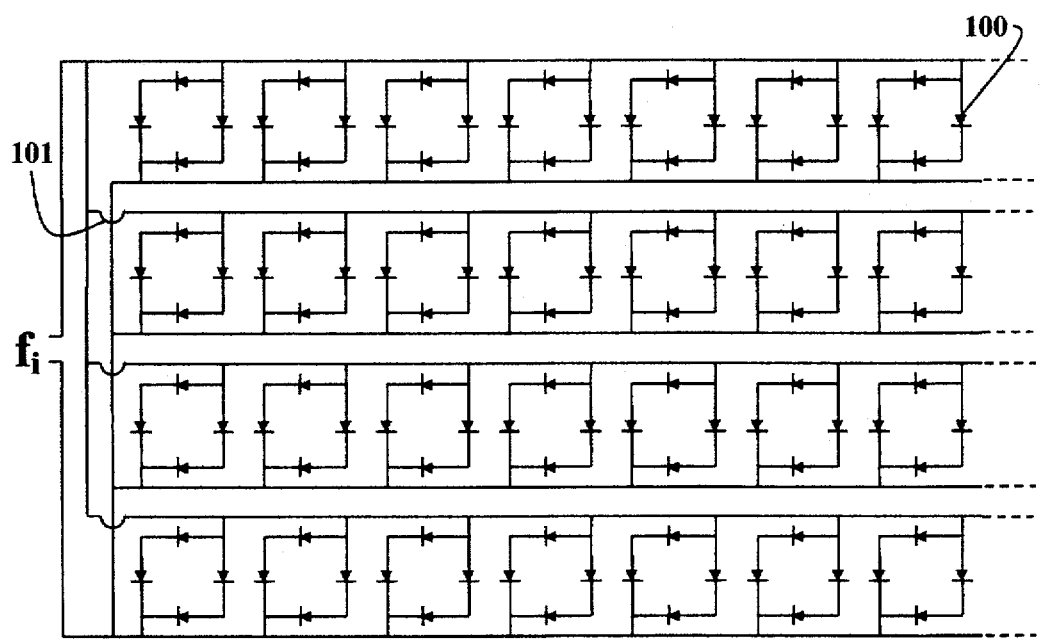
FIG. 10. is a schematic illustration of one linear stripe modulator.

A second specific millimeter wave embodiment which employs a linear array of stripe modulators orthogonal to and in tandem with a linear array of stripe detectors is shown in FIG. 9. Again the system is configured as in FIG. 1. Here a horizontal linear modulator array 90 overlaps a vertical linear detector array 91. The two arrays are in such close proximity as to be effectively in the focal plane of the imaging lens. Alternativily, a second lens may be used to reimage the scene onto the detector array. Each stripe modulator is driven by a unique time varying signal provided by the modulation function generating circuit, shown here as horizontal 93 array drivers. Detection and amplification of the modulated signals from each stripe is provided by a parallel circuit 92. Each pixel is uniquely identified by the overlap of one vertical and one horizontally stripe. This method requires far fewer generating functions than the method described above. While this embodiment is not limited to millimeter waves for the purpose of effecting a millimeter wave imager a square loop antenna array is used. A horizontal modulator stripe composed of square loops is shown in FIG. 10. Again either Schottky or PIN diodes 100 in square loops are used. Electrical lines are appropriately insulated from one another by insulator patches 101 as described above. After collection and amplification the signal is decoded as in the first specific embodiment.

A thrid specific millimeter wave embodiment employs two linear arrays of stripe modulators as shown in FIG. 9. Modulation of the horizontal stripe array 90 is provided by modulation driver circuit 93 and modulation of the vertical stripe array 91 is provided by modulation driver circuit 92. The arrays are arranged in tandem and orthogonal to each other. Each pixel is uniquely labeled by the product of its respective horizontal and vertical stripe modulation function. After collection and amplification the signal is decoded as in described in the first specific embodiment.

Figure 11:
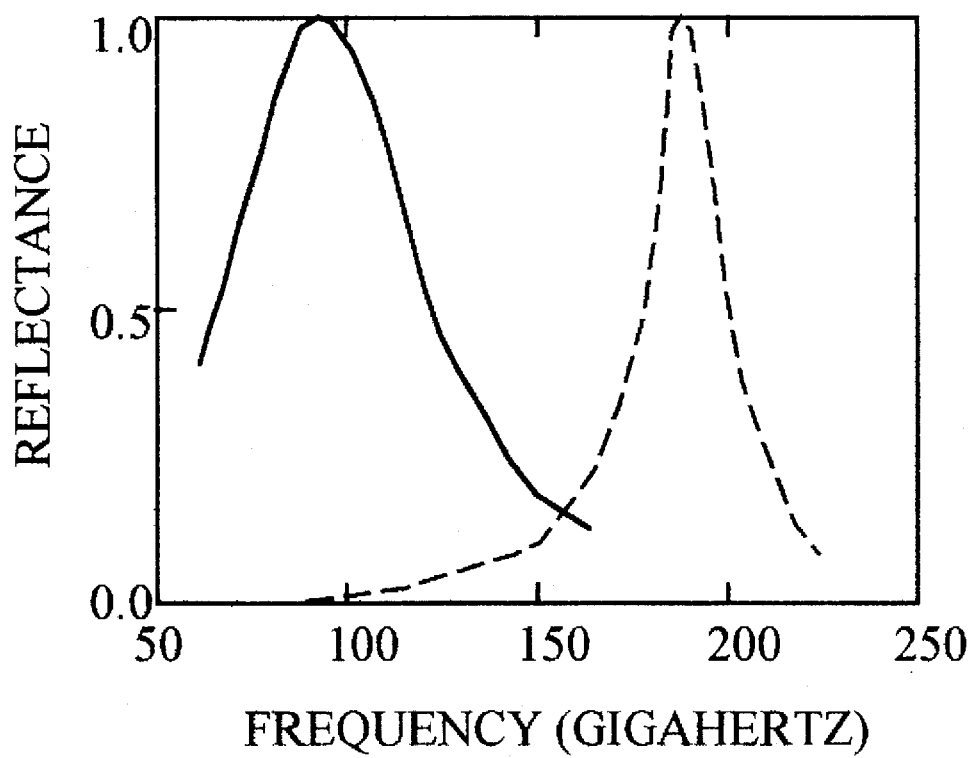
FIG. 11. is the reflectance response of a square loop modulator.

In a fourth specific millimeter wave embodiment a reflectance imagery is described. The system is configured as in FIG. 2. The modulator employed is similar to that described in the first specific embodiment above. However, the transmittance of the modulator is not of direct significance. The reflectance of a square array of loops is shown in FIG. 11. The solid line is the reflectance of the loops with gaps closed and the dashed line with gaps opened. After signal collection and amplification the signal is decoded by the application of the appropriate transform.

There are many variations possible within the general framework of this invention. In the interest of economy only a few have been described above. The specific embodiments of the invention described above should not be considered to limit the invention. The invention is to be limited only by the following claims.

We claim:

1. An electronic imaging system comprising:

a spatial light modulator composed of a planar linear array of stripe modulators;

a linear array of stripe detectors positioned in tandem with, and orthogonal to said linear array of stripe modulators;

means for imaging scene radiation onto the said spatial light modulator and said stripe detector array;

means for driving each said stripe of the said modulator array with a specific time varying function with the result of encoding the radiation impinging on each said stripe;

means for applying an appropriate transform to the detected signal from each stripe detector with the result of decoding said signals and deriving the intensity at each pixel of the image by correlation with respective modulator and detector stripes.

2. The electronic imaging system of claim 1 wherin each component interacts with millimeter wave radiation.

3. The electronic imaging system of claim 2, wherein in said modulator stripe is comprised of arrays of metallic square loops wherein gaps in each loop side are closed or opened with diode switches.

* * * * *